Nov. 5, 1935.  V. W. PETERSON  2,019,766
CONTROL DEVICE
Filed Nov. 18, 1932
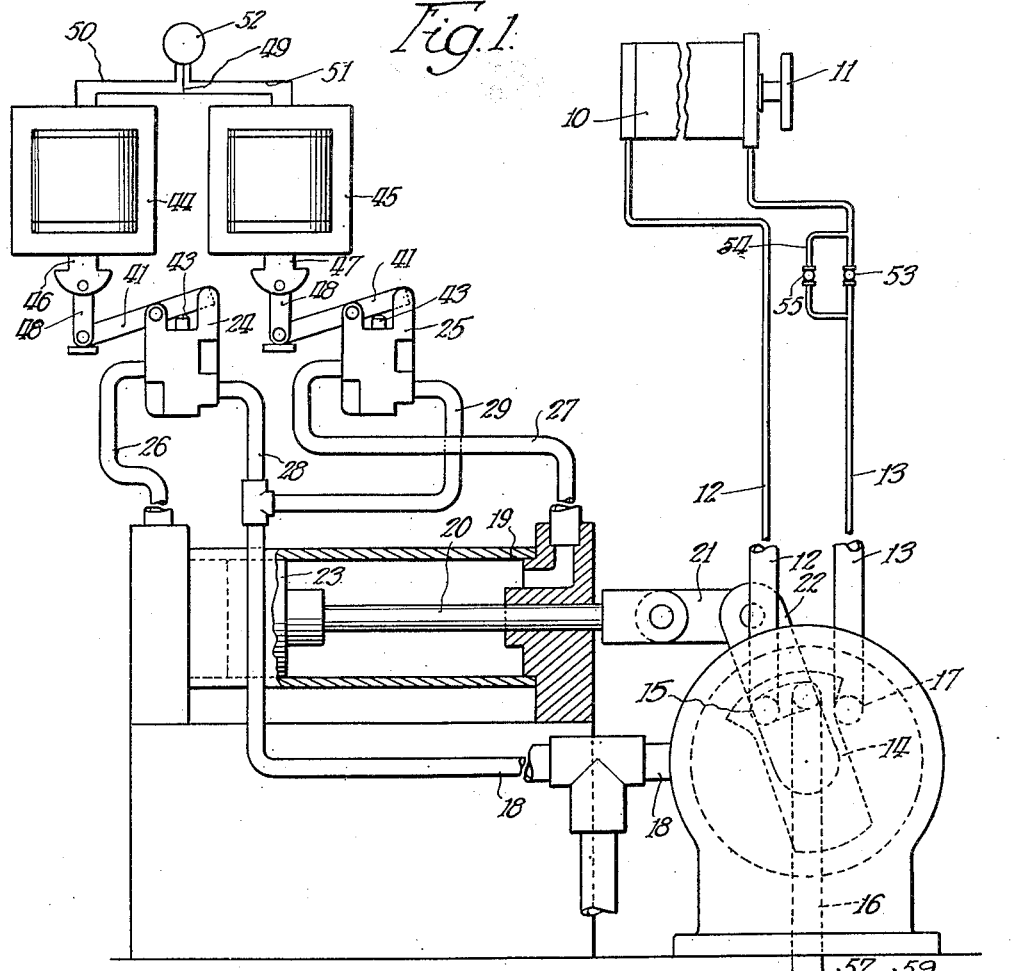
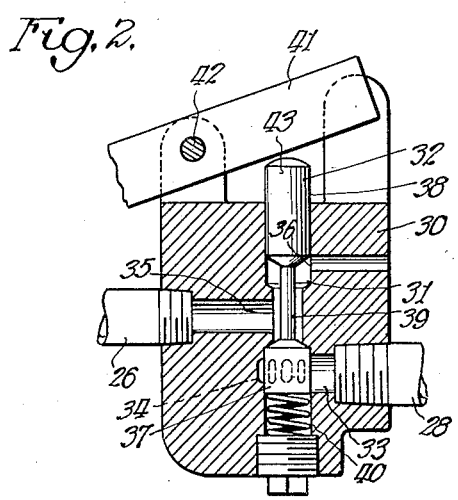
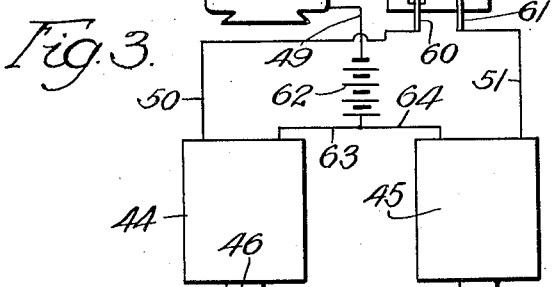
Inventor
Victor W. Peterson
Roland C. Rehm
Atty.

Patented Nov. 5, 1935

2,019,766

UNITED STATES PATENT OFFICE 2,019,766

CONTROL DEVICE

Victor W. Peterson, Chicago, Ill., assignor to Hannifin Manufacturing Co., Chicago, Ill., a corporation of Illinois Application November 18, 1932, Serial No. 643,156

1 Claim. (Cl. 137—139)

This invention relates to valve control, and among other objects aims to provide improved valve control means for large capacity valves and for operation either manually or by time-cycle apparatus.

The invention may be readily understood by reference to one illustrative construction embodying the invention and shown in the accompanying drawing.

In said drawing:

Fig. 1 is an elevation, somewhat diagrammatic in view showing control mechanism for operating an air cylinder;

Fig. 2 is a detail view of a pilot valve; and

Fig. 3 is a diagrammatic view illustrating one form of a time controlled switch for actuating the solenoids.

The illustrative apparatus is here shown applied to the control of a large air cylinder 10 employing a relatively large capacity air valve, to secure improved accuracy in the cycle of operations in the cylinder. One example of the use of an air cylinder of this character is for heat treating operations where the time during which articles are subject to heat treatment must be very accurately controlled. Time lag or irregularities in the operating mechanism is highly objectionable, whether the control mechanism be actuated manually or by an appropriate time switch for the purpose of securing continuous repetition of the cycles of the cylinder. The cylinder is here shown equipped with a plunger pusher 11 which represents means for passing articles progressively through the appropriate operations. The cylinder is actuated in this case pneumatically by air lines 12 and 13 connected to the respective ends of the cylinder on opposite sides of the plunger piston.

Control of the air lines is effected by a relatively large capacity disk valve 14 of the type shown for example in my co-pending application Serial No. 622,192. In the present instance this valve is of a type which has only two positions, one of which is indicated in dotted lines in Fig. 1 wherein the line 12 is connected through the passage 15 in the disk with an exhaust passage 16 in the valve housing with which the passage 15 registers. In this position, pipe 13 is connected through its ports 17 with air pressure supplied to the interior of the valve housing at the back of the disk from air pressure line 18. The valve disk is placed in the second position by rocking through a small angle (45° in this instance). The line 13 is then connected with the exhaust through passage 15 in the disk valve and line 12 is connected with the air pressure from line 18. Movement of the valve thus connects one or the other side of the piston with air pressure and the opposite side with the exhaust.

To insure reliable operation, the valve is actuated in this instance by an operating cylinder 19 whose piston rod 20 is connected through a link 21 with the valve disk rocking arm 22. This cylinder possesses a substantial excess of power to insure actuation of large capacity valves (¾ inch and over) under all conditions of maintenance of the valve. It may be either single acting (with spring return) or double acting, depending on the character of operations to be performed by the apparatus. The cylinder here illustrated is double acting, and its piston 23 is actuated in opposite directions by pin type pilot valves 24 and 25 connected to the respective ends of the cylinder by pipes 26 and 27. Air under pressure may advantageously be supplied from the same air pressure line 18 which supplies valve 14, and conducted to the valves respectively by branch pipes 28 and 29.

As shown in Fig. 2, the pilot valves comprise a valve body 30 having a central bore 31 within which reciprocates the valve pin 32. Air is admitted to the valve body through the passage 33 connected with the air supply line and having ports distributed around the valve. The cylinder 30 is connected to the valve through port 35, and air is exhausted therefrom through port 36. The pin valve has enlarged ends 37 and 38 which serve to cover the inlet and outlet ports, and a reduced intermediate portion 39 to provide a passage for the air traveling into or out of the cylinder inlet port 35. A spring 40 normally presses the valve pin upwardly to close the inlet ports 34 and open the cylinder port to exhaust. The valve pin is operated to open the same to air pressure by a lever 41 pivoted at 42 on the valve body and adapted to engage the protruding extremity 43 of the valve pin.

The valves are actuated respectively by solenoids 44 and 45 whose armatures 46 and 47 are connected by links 48 with the levers 41 of the respective valves. The solenoids are of a type which may be readily purchased on the market and a detailed description thereof is therefore unnecessary. The character of the solenoid coil winding of course depends upon the particular current available where the apparatus is intended to be used. The operative travel of the solenoid coil or plunger in the present instance need not be great since the range of movement of the valve pins 43 is in this instance substantially less than an inch. The valve pins require little force to operate them, hence substantial multiplication by elongating the lever arms of levers 41 is unnecessary.

The solenoids are conveniently controlled by a three-wire line, one side 49 of the line serving terminals on each of the solenoids and the other two wires 50 and 51 being connected respectively to the other terminals of the solenoids. The three wires may be extended to any remote point and the solenoids may be actuated manually, if desired, from a plurality of stations by simple push buttons which momentarily close the circuit. If desired, a time cycle device 52 may also be included in the circuit so as automatically to actuate the solenoids alternately at definite times.

In the present instance the actuation of solenoid 44 causes air to be admitted at the left end of the cylinder, thereby moving piston 23 to the right and operating valve 14 to move plunger 11 on its forward or active stroke. Since the volume of cylinder 19 is small (yet under ordinary air pressures it exerts a force greatly in excess of that required to operate valve 14) it requires but a momentary actuation of the solenoid (and therefore the pilot valve) to complete a stroke of piston 23. The circuit controlling the solenoid need therefore be closed (whether manually or automatically) only momentarily. For example, the interval of time usually consumed in pressing an ordinary push button and then releasing it is sufficient to effect a movement of piston 23 through a complete stroke. On breaking of a solenoid circuit spring 40 which has previously been depressed, returns the pin valve 43 to its initial position closing the air inlet ports 34; and actuating the solenoid 45 at any time (whether immediately after or a substantial interval after the actuation of solenoid 44) causes a return stroke of piston 23 moving valve 14 to its initial position (that shown in Fig. 1) and causing a return stroke of plunger 11. To regulate the rate of forward speed of plunger 11 a check valve 53 may be placed in line 13 which is by-passed by line 54 containing an adjustable needle valve or other valve 55. Valve 55 may be regulated to adjust the rate of exhaust but the check valve operates to permit air pressure to pass directly and freely through line 13 into cylinder 19 for a rapid return stroke.

Where a continuous repetition of cycles of operation is desired, the solenoids are advantageously energized from an electric time switch 52 which is arranged alternately to close circuits through solenoids 44 and 45 at the proper intervals. Such absolute control of the duration of the cycles is important for example in connection with heat treating operations and the like referred to above. Every phase of the cycle of operation is controlled as contrasted with operation by electric motor where the possibility of over-travel of the motor introduces erratic variations in the duration of the cycle.

The time controlled switch mechanism 52 illustrated in Fig. 3 comprises a uniformly rotating driving mechanism 56 in the form of a clock or synchronous motor carrying on its shaft 57 a contact drum 58 made of electrically insulating material. The drum carries a pair of contacts 59 grounded to the frame of the mechanism and electrically connected with the wire 49. Engaging the drum in position to contact periodically with the contacts 59 are brushes 60 and 61 connected respectively through wires 50 and 51 with the solenoids 44 and 45. A source 62 of electric power is connected to wire 49 and through wires 63 and 64 respectively with the other terminals of solenoids 44 and 45. The rotation of the contact drum 58 therefore alternately causes the brushes 60 and 61 to engage contacts 59 and alternately close circuits through solenoids 44 and 45, thereby to operate the valves 24 and 25. The time cycle of operation of the solenoids may be fixed first by the speed of rotation of the driving mechanism 56, and, second, by the number and relative location on the drum 58 of the contacts 59.

Where the interval between successive strokes of piston 23 is relatively short (and not long enough to cause undue heating in the solenoid windings) one stroke of the piston 23 may be effected by a spring placed around the piston rod in cylinder 19 between the piston and the cylinder head. Whether such stroke be the return or forward stroke depends upon the cycles of operation desired. In that case, only a single pilot valve and solenoid need be employed. The power of the piston 23 is sufficient not only to actuate valve 14 but to compress the spring which effects its return stroke. With such an installation, the electric time cycle device controls both the instant of actuation of the solenoid and the interval of time during which the solenoid is energized, since the latter interval controls the time when the return stroke of piston 23 takes place. It should be remembered that upon de-energization of the solenoid, the pin valve 43 automatically moves to exhaust position so that a spring could immediately commence a return stroke of the piston. Where however the interval between successive strokes of the piston is so great as to cause danger of over-heating of the solenoid, it is preferable to employ a double acting cylinder with solenoids and pin valves for each end of the cylinder. A single acting spring return cylinder may also be employed with a rotary disk valve incorporating a ratchet by which the valve rotates only in one direction (such valves are well known on the market). The spring actuated return stroke of the cylinder would be an idle stroke, and only forward strokes of the piston would operate the valve, one forward stroke moving the valve to one position (for example, to produce a forward stroke of the main cylinder 10) and the next forward stroke moving the valve to a different position (to produce a return stroke of the main cylinder). Thus a single solenoid would control both strokes of the main cylinder, and there would be no heating of the solenoid core regardless of the interval between successive movements of the main cylinder.

It is apparent from the foregoing that the response of piston 23 and valve 14 to the solenoids is not only remarkably prompt (no lag in the response being appreciable) but the power of piston 23 is amply adequate for large capacity valves. On the other hand, the size and length of the stroke of the pilot valves are small enough to insure absolutely reliable operation and control by the solenoids.

Obviously the invention is not limited to the specific uses here enumerated for illustrative purposes nor is it limited to the details of the illustrative construction herein described. Moreover it is not indispensable that all features of the invention be used conjointly since various features may be used to advantage in different combinations and sub-combinations.

Having described my invention, I claim:

Power apparatus adapted to perform cyclical operations in an accurate time cycle comprising in combination a pneumatic power cylinder and piston adapted to be actuated periodically to perform said operation, a large capacity rotary disk valve not less than three-quarter inch size having air lines connected with the opposite ends of said power cylinder and having an exhaust port and adapted alternately to admit air to each side of said piston and open the other side to exhaust, a small valve operating cylinder having a piston rod connected to said disk valve to oscillate the latter to effect the aforesaid operations, small pilot valves connected with the respective ends of said valve operating cylinder to control the movements of its piston, said pilot valves being each connected with an air pressure line independently of the other pilot valve, small solenoids for operating said pilot valves, said solenoids being designed to be actuated instantaneously with electric power of relatively low voltage and current, and an electric circuit including circuit closing means for selectively energizing said solenoids to effect the aforesaid cyclical operation of said power cylinder.

VICTOR W. PETERSON.